United States Patent

Baudin et al.

[11] Patent Number: 6,089,411
[45] Date of Patent: Jul. 18, 2000

[54] DISPENSING HEAD AND UNIT FOR A PRODUCT WITH A LIQUID-TO-VISCOUS CONSISTENCY COMPRISING A FLOW REDUCER, AND METHOD OF MANUFACTURING SAME

[75] Inventors: Gilles Baudin, Domont, France; Stanislas De Nervo, Tokyo, Japan; Nicolas Albisetti, Sevran, France

[73] Assignee: L'Oreal, Paris, France

[21] Appl. No.: 08/945,412

[22] PCT Filed: Feb. 21, 1997

[86] PCT No.: PCT/FR97/00328

§ 371 Date: Jan. 21, 1998

§ 102(e) Date: Jan. 21, 1998

[87] PCT Pub. No.: WO97/31837

PCT Pub. Date: Sep. 4, 1997

[30] Foreign Application Priority Data

Feb. 29, 1996 [FR] France .................................. 96 02560

[51] Int. Cl.⁷ .................................................. B65D 37/00
[52] U.S. Cl. .......................... 222/212; 222/490; 222/494; 222/546
[58] Field of Search ................................. 222/212, 490, 222/494, 546

[56] References Cited

U.S. PATENT DOCUMENTS

| | | | |
|---|---|---|---|
| 2,743,852 | 5/1956 | Alberdi, Fr. | 222/494 |
| 2,937,795 | 5/1960 | Ciliberti | 222/490 |
| 3,342,318 | 9/1967 | Ruekberg et al. | 222/490 |
| 4,749,108 | 6/1988 | Dornsbusch et al. | 222/490 |
| 4,991,745 | 2/1991 | Brown | 222/212 |
| 5,033,655 | 7/1991 | Brown | 222/212 |
| 5,115,950 | 5/1992 | Rohr | 222/490 |
| 5,271,531 | 12/1993 | Rohr et al. | 222/212 |
| 5,632,420 | 5/1997 | Lohrman et al. | 222/212 |
| 5,865,353 | 2/1999 | Baudin | 222/546 |

FOREIGN PATENT DOCUMENTS

| | | |
|---|---|---|
| 330 785 | 9/1989 | European Pat. Off. . |
| 395 380 | 10/1990 | European Pat. Off. . |
| 442 379 | 8/1991 | European Pat. Off. . |
| 33 47 079 | 7/1985 | Germany . |
| 773 761 | 5/1957 | United Kingdom . |

*Primary Examiner*—Kenneth Bomberg
*Attorney, Agent, or Firm*—Oblon, Spivak, McClelland, Maier & Neustadt, P.C.

[57] ABSTRACT

The invention relates to a dispensing head for a product of a liquid to viscous consistency, as well as a dispensing unit fitted on this head. This head has a rigid cap capable of being fixed on a reservoir for the product. An elastic flow reducing element is joined to the cap and is fitted with at least one slit provided with edges capable of moving away from one another under the thrust of the product and of returning to an initial position when the thrust stops. In the initial position, the edges of the slit are noncontiguous and are spaced from one another at a predetermined distance so as to define an opening through which the product cannot flow to any appreciable extent by gravity, substantially reducing the thrust to be applied for causing the product to emerge.

17 Claims, 4 Drawing Sheets

DISPENSING HEAD AND UNIT FOR A PRODUCT WITH A LIQUID-TO-VISCOUS CONSISTENCY COMPRISING A FLOW REDUCER, AND METHOD OF MANUFACTURING SAME

BACKGROUND OF THE INVENTION

1. Field of the Invention

The invention relates to a dispensing head comprising an elastic flow reducing element for a product of a liquid-to-viscous consistency, as well as to a dispensing unit fitted with this dispensing head.

2. Description of the Related Art

The dispensing unit is intended more particularly to equip a reservoir containing a product and to permit the dispensing of this product in good condition. This product may be a cosmetic, dermatological or food product, such as for example, a shampoo, a foaming gel for a shower, a hair gel, liquid soap, a face cream, body lotion, a liquid foundation cream or a household product, a liquid glue.

The aim of the invention is, in particular, a dispensing unit of the kind which comprises a semirigid or flexible reservoir, fitted with a rigid or semirigid dispensing head provided with an elastically deformable dispensing opening.

Thus, from European Patent No. 395 380, for example FIGS. 6 and 7, a tube for a liquid product is fitted with a dispensing head that has a cap provided with an opening for the emergence of the product, the opening being closed by an elastic membrane, in which there is a slit. The membrane is attached to a rigid portion of the cap. Fastening means hold the membrane in position on the dispensing head. According to this document, the elastic slit ensures sealing of the tube in relation to the outside, the closing of the slit being effected automatically. When the user exerts pressure on the side wall of the tube, the edges of the slit move apart from one another under the thrust of the product and close a gain when the thrust of the product stops. The edges of the slit are contiguous, which renders superfluous the closing of the outlet opening by a stopper. Generally, the making of contiguous slits is obtained by a mechanical cutting of the membrane by a cutting tool.

However, this tube has drawbacks both in use and in manufacture indeed, in order to cause a dose of the product to emerge by pressure on the tube, the user must press strongly at the start to cause the slit to open; the start of the dispensing is then effected in a sudden manner. Because of this strong pressing, the product emerges from the open slit at high speed and surprises the user. Thus, by the time the user becomes aware of this emergence and stops pressing on the tube, an unduly large quantity of the product has already emerged from the reservoir, thus making a precise dosing of the product difficult. As for the manufacture of this dispensing head, the making of the slit effected by cutting the membrane requires the membrane to be taken up again on an additional piece of equipment. This extra step considerably increases the cost of this dispensing head of the prior art. As a result, such a dispensing head is not suitable for widely distributed products such as a shampoo or a dishwashing product, for which the price must be moderate.

SUMMARY OF THE INVENTION

The object of the present invention is therefore to provide a dispensing head and a dispensing unit provided with this dispensing head, with a reduced operating force necessary for the dispensing of a dose of the product, while ensuring the dosing of the product in a soft and easy manner when moderate pressure is exerted on the reservoir of the unit. This object is obtained by providing a membrane with a non-contiguous slit, obtained in particular by a single moulding operation. The width of the slit is chosen according to the viscosity of the product, so as to prevent substantially any outflow of the product under the effect of gravity. In practice, it has been found that the slits act as a means for retaining the product by capillarity, consequently permitting the packaging of practically any product of a liquid-to-viscous consistency. The manufacture of this dispensing head is simple and extremely economical, and offers reliable operation and easy use.

Contrary to the expert's suggestions, it has been discovered that it is not necessary to have an elastic outlet slit whose edges are contiguous for dispensing (or retaining) a liquid or viscous product.

Thus, a first aspect of the present invention relates to a dispensing head for a product of a liquid-to-viscous consistency, comprising a rigid cap having joined thereto an elastic flow reducing element fitted with at least one slit provided with edges capable of moving away from one another under the thrust of the product and of returning into an inial position when the thrust stops, characterized in that, in the initial position, the edges of the slit are non-contiguous and are disposed interspaced from one another at a given distance so as to delimit an opening through which the product cannot flow to any appreciable extent by gravity, thereby substantially reducing the force to be applied to cause the product to emerge.

Generally, the first position corresponds to a "head up" position, and the second position to a "head down" position.

In accordance with the invention, the edges of the outlet slit are not contiguous. This slit may be obtained by moulding and not by cutting.

It has been discovered surprisingly that, by adjusting the distance between the edges of the slit according to the viscosity of the product, it was possible to obtain a dispensing unit capable of reducing and even eliminating the free flow of the product by gravity in its vertical position, hen the dispensing head is directed downwards. Moreover, by obtaining the slit by moulding, it has been found that it was possible to reduce the manufacturing price of a dispensing head to one third or even a quarter, as compared with the manufacturing price of a dispensing head of the prior art comprising a membrane with a slit obtained by mechanical cutting.

The use of the dispensing head of the invention is easy, because moderate pressure on the reservoir is sufficient to start the dispensing of the product. After the product has been dispensed, there occurs a renewed air intake via the slit, ensuring the replacement of the volume of the dispensed liquid, and the flow of the product is stopped without the occurrence of any run out. Thus, contrary to the prior art, the dosing of the product by the user can be effected in a soft and precise manner.

In practice, the cap is formed of a rigid or semirigid thermoplastic material, for example of polyethylene or polypropylene. This cap is fixed, for example by screwing or by a catch engagement, on a bottle forming the reservoir for the product to be dispensed. Advantageously, this bottle is semi-rigid or flexible, provided with compressible sides, so that pressure on the sides of the bottle starts the dispensing of the product. Advantageously, this cap is provided with a dispensing duct closed by the elastic element.

Preferably, this elastic element is a membrane made of an elastomeric material, and more preferably of a thermoplastic elastomer. More precisely, this membrane is formed by a flexible material having a shape memory for reassuming its initial shape after deformation. Advantageously, this material is chosen so that the membrane can be moulded in a single piece together with the cap, for example by duplex injection moulding. For this purpose, an elastomer is chosen that is physically and chemically compatible with the rigid material of the cap and capable of forming a solid bond with the rigid material by thermofusion. Typically, the membrane is constituted, for example, by mixtures of polypropylene and of block copolymers of styrene-butadiene-styrene, or of polypropylene and block copolymers of styrene-ethylene-butylene-styrene, or of polypropylene and block copolymers of ethylene-propylene-diene.

In general, the membrane takes the form of a round disk. It is possible, however, to make it in any shape. The surface of this round disk may be flat, but advantageously this surface is domed, for example, concave or convex.

The slit made in the membrane is preferably situated at the center of the round disk; this slit constitutes a dispensing opening. The edges of this slit move away from one another when the user exerts pressure on the inverted bottle to cause the dispensing of a dose of the product. Thanks to the elasticity of the membrane, the slit reassumes its original shape, when the pressure on the bottle is relaxed; the outflow of the product is then stopped.

The slit of the membrane may be made by moulding, with a view to reducing the manufacturing cost during the manufacture of the cap by the duplex injection moulding of (i) the rigid or semirigid material forming the cap and then of (ii) the elastomeric material forming the elastic element. Typically this slit has a length of approximately 0.2 cm to 2 cm. In accordance with the invention, its width is in the range of 0.05 mm to 1.0 mm, and preferably 0.1 mm to 0.5 mm. Advantageously, it has a rectilinear shape. If required, the edges of the slit may be bevelled. According to a preferred embodiment of the invention, the membrane has two cross slits forming a right angle between them. The orientation of the slit or slits may be of any kind.

Moreover, the cap may comprise a folding lid capable of being positioned on the elastic element and intended to ensure the protection of the membrane during the storage of the product. Advantageously, this lid is hinged to the cap, preferably by a film hinge. This hinge permits the integral moulding of the dispensing head (cap-hinge-lid-membrane with the slit) in a single piece.

The internal side of the lid may comprise one or several sealing means capable of coming to bear on the elastic element. Thus, this internal side may be provided with a cross-shaped projecting element of a shape complementary to that of the cross slits, capable of being applied in a leakproof manner above the slits in the vicinity of their edges, to avoid any untimely outflow of the product during carriage. Similarly, the internal side of the lid may comprise an annular bead capable of surrounding the slit or slits and of being applied in a leakproof manner against the membrane. The two sealing means may be used separately or equip the same lid.

The dispensing head in accordance with the invention is in particular intended to equip a dispensing unit comprising a reservoir for a product of a liquid-to-viscous consistency.

A second aspect of the invention is constituted by a dispensing unit comprising a compressible reservoir containing the product of a liquid or viscous consistency to be dispensed, the dispensing head of the first aspect being fixed on this reservoir.

The viscosity of this product is in practice situated in the range extending from 0.8 Pa·s to 10 Pa·s and more particularly in the range extending from 1.2 Pa·s to 8 Pa·s.

Advantageously, the product takes the form of a gel. This gel is, in particular, a shampoo, a shower gel, a face cream, a make-up remover or thinner gel.

The invention also provides a method for manufacturing a dispensing head of the first aspect, this method consisting of the following steps:
  a) moulding a rigid cap in an appropriate mould by injection of a first rigid thermoplastic material,
  b) moulding the elastic element in an elastomeric material on the cap by duplex injection moulding, the mould comprising means for forming the slit, and
  c) removing the head from the mould after cooling.

To render the present invention more readily understood, several embodiments of a dispensing unit in accordance with the invention are shown in the attached drawings and will now be described by way of purely illustrative and in no way restrictive examples.

DETAILED DESCRIPTION OF THE PREFERRED EMBODIMENTS

Figure 1:
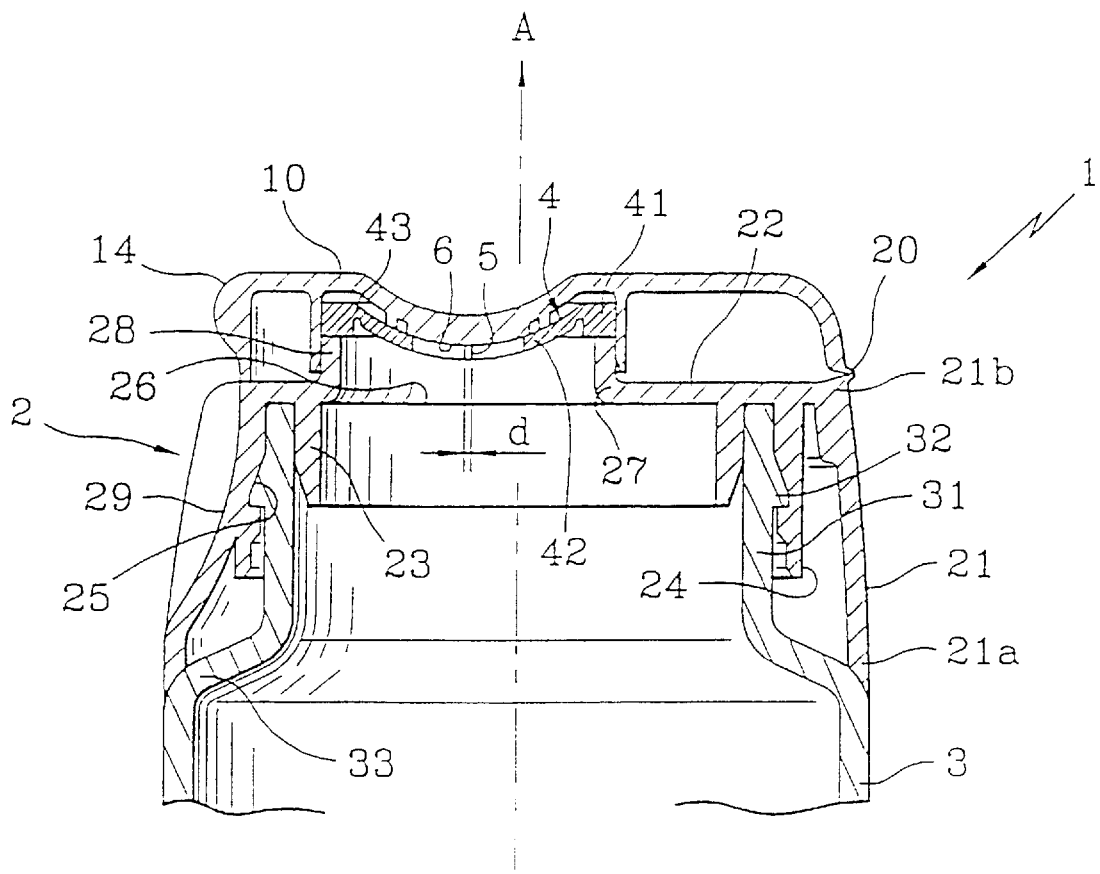
FIG. 1 shows a partial axial section of the dispensing unit in accordance with a first embodiment of the invention; in its storage position.

Referring to FIG. 1, there may be seen an upper portion 1 of a container 3 forming a reservoir for a product, such as a shampoo having, for example, a viscosity of approximately 3 Pa·s. This container 3 is provided with an axis of symmetry A. It is compressible and formed, for example, by a thermoplastic material such as polyethylene. This container 3 is provided with an open neck 31 of a cylindrical shape, provided with a catch engagement bead 32. A transition zone between the neck 31 and the container 3 is formed by a shoulder 33.

A dispensing cap 2, provided with a folding protective lid 10 and with an elastic dispensing element 4 forming a flow reducer, is fixed on this container 3 by catch engagement Advantageously, the material constituting the cap 2 is a relatively rigid thermoplastic material, polypropylene for example.

The cap 2 has a body 21 of a general cylindrical or oval shape, matched to the shape of the container 3 and provided, on the side turned towards the container 3, with a lower end 21a and, on the opposite side, with an upper end 21b.

The lower end 21a rests on the shoulder 33 of the container. The upper end 21b is joined to a plate 22 of a shape generally matched to that of the body 21 of the cap 2. This plate 22 carries a first internal cylindrical skirt 23, extending from the side of the neck 31 and being capable of being engaged with friction inside the neck 31. A second, external cylindrical skirt 24, concentric with the first skirt 23 and of an axial length greater than that of the first skirt 23, surrounds the outside of the neck 31 in a leakproof manner. This second skirt 24 has an annular rib 25 capable of cooperating with the bead 32 of the neck 31.

The plate 22 is provided with a circular dispensing opening 26 which is eccentric relative to the axis A. An edge 27 of this opening 26 is extended in a cylindrical tube 28 that carries the elastic dispensing element 4 towards the lid 10.

The elastic element 4 has the general shape of a disk and comprises an annular peripheral bulge 41 and a central dish-shaped membrane 42 with a concavity turned towards the inside of the cap. The peripheral bulge 41 has a thickness greater than that of the central membrane 42. This elastic element 4 is constituted by a thermoplastic elastomeric material, for example, a mixture of polypropylene and block copolymers of styrene-ethylene-butylene-styrene. Advantageously, this material has a Shore A hardness between 30 and 60.

The peripheral bulge 41 is joined to the cylindrical tube 28 of the cap 2 during the moulding of the cap 2 by duplex injection moulding of the elastomeric material forming the elastic element on the rigid material forming the cap 2. In general, the two materials and the moulding conditions are chosen so that a solid bond is formed by thermofusion and/or by a mechanical joint between the cap 2 and the elastic element 4.

An annular transition zone 43 delimiting the peripheral bulge 41 and the central membrane 42 and defining an annular groove has a reduced thickness as compared with the rest of the membrane. By this arrangement, a particularly flexible central membrane 42 is obtained.

Figure 2:
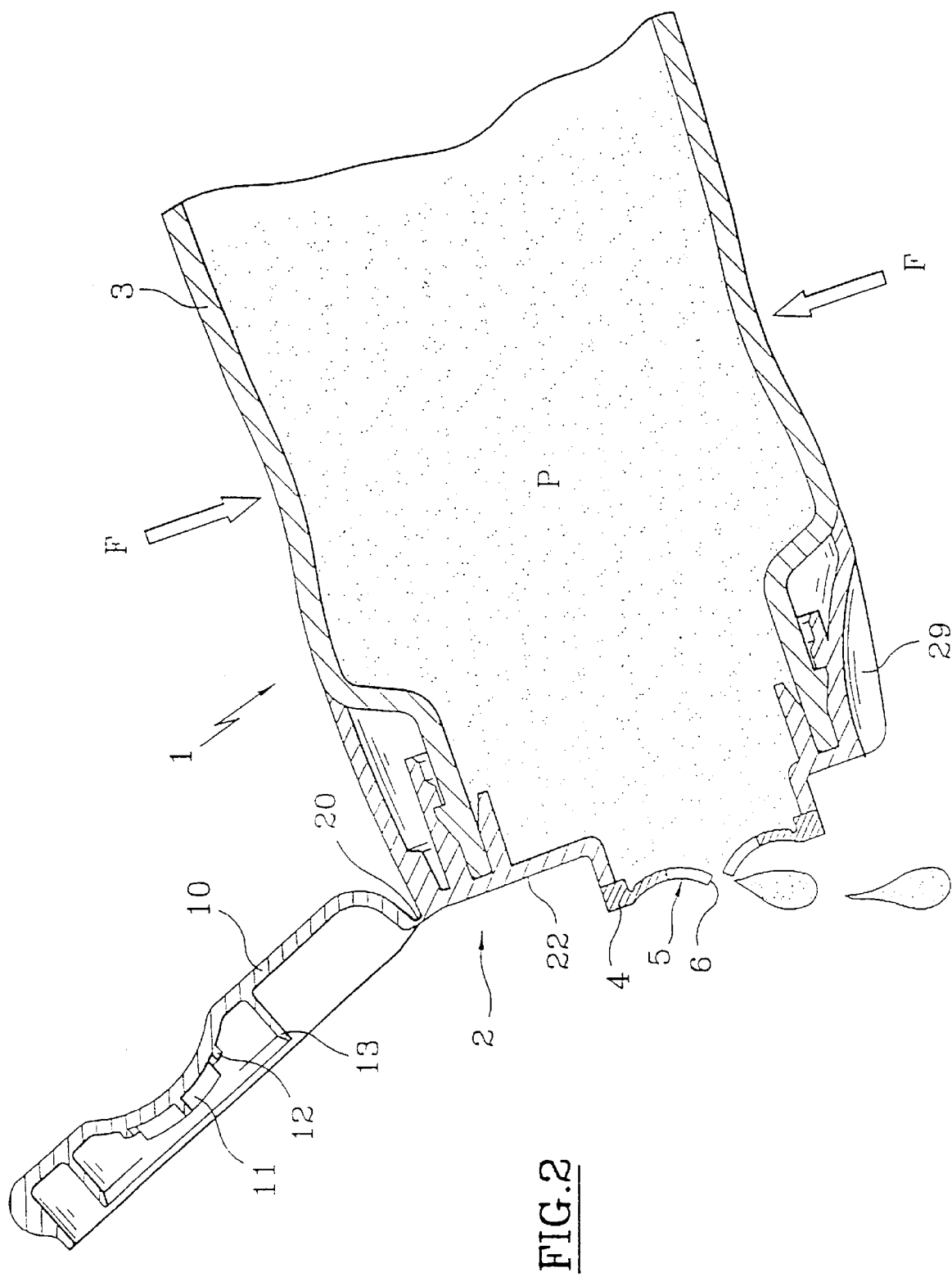
FIG. 2 shows a partial axial section of the unit of FIG. 1 in its position of use.
Figure 3:
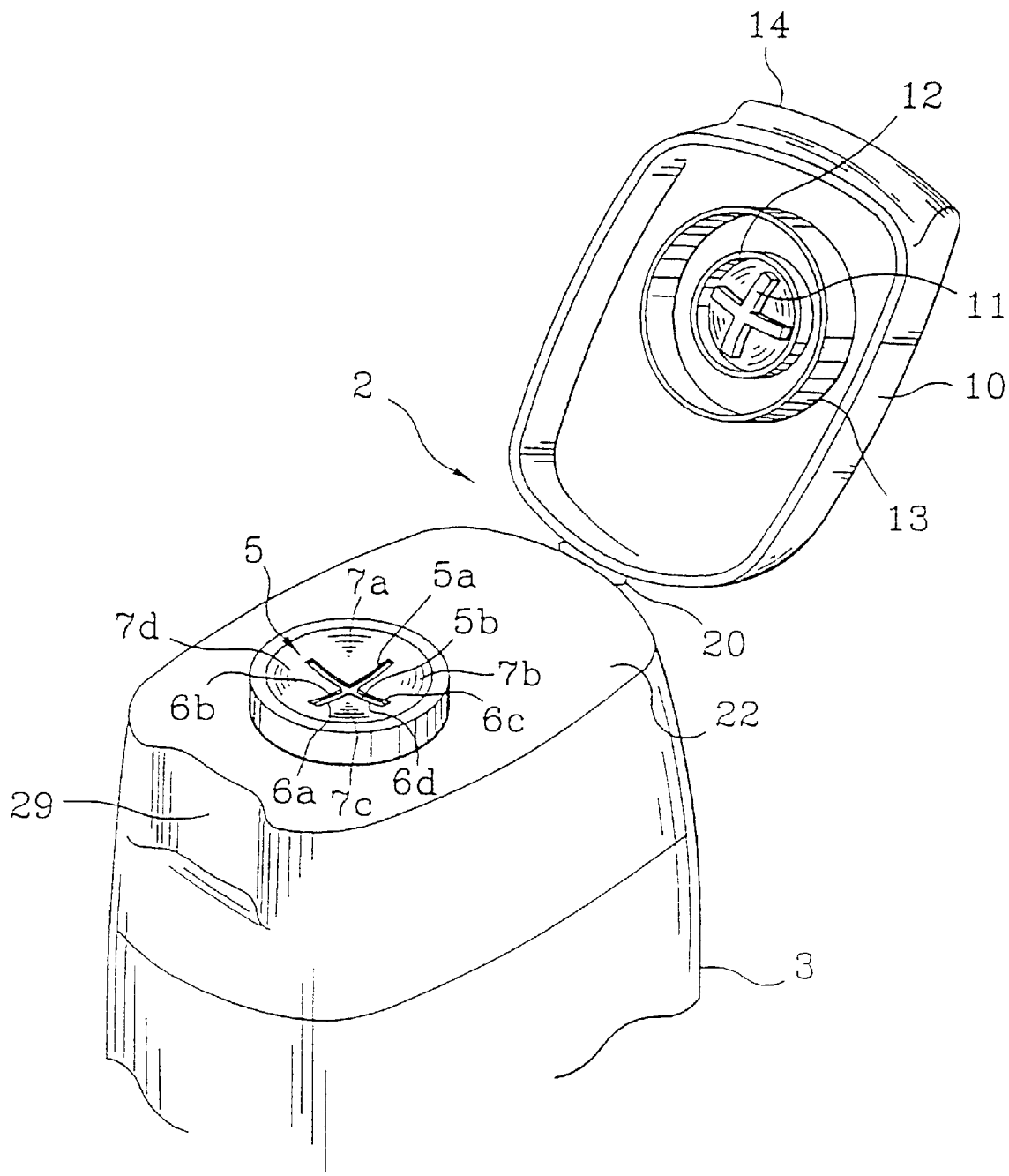
FIG. 3 shows a view in perspective of the unit of FIG. 1, the lid being in its open position.

Two crossed slits 5a, 5b (see FIG. 3) with branches of equal length are obtained in the central membrane, forming a right angle between them. Each slit 5a, 5b has respectively two edges 6a, 6b; 6c, 6d parallel to each other, these edges being spaced from one another at a distance d in FIG. 1 of approximately 0.3 mm. Thus, FIG. 3, the slits 5 define four sectors 7a to 7d, capable of bending outwardly of the cap 2, as shown in FIG. 2 (upside down), under the thrust of a product P. For this purpose, the user keeps the container 3, in a position close to that shown in FIG. 2 by exerting on the container 3 light pressure, indicated by the arrows F, for dispensing a dose of the product P. The dispensing is stopped when the pressure on the container 3 is relaxed. Even if the container is kept in the upside down position, no outflow of the product P is observed, in spite of the fact that the edges 6 of the slits 5 are not contiguous.

The cap 2 has, moreover, a concave cutout (see FIGS. 1 and 3) in the form of a circular arc, and on the opposite side remote from this cutout there is a film hinge 20 joined to the plate 22. The lid 10 is articulated by this hinge 20, which is capable of preventing an accidental outflow of the product in the closed position, for example during carriage of the unit. For this purpose, the lid 10, which is of a shape complementary to that of the plate 22, comprises sealing means which include a cross-shaped protuberance 11 with dimensions chosen so as to completely cover the slits 5a, 5b. This protuberance 11 is surrounded by an annular bead 12 intended to be placed in a leakproof manner on the membrane in the closing position, so as to encircle the slits 5a, 5b. A cylindrical skirt 13, concentric with the bead 12, is provided to be placed around the tube 28 of FIG. 1 in a leakproof manner, in the closed position, the peripheral bulge 41 of the membrane 42 coming into close contact against the internal side of this skirt 13 in FIG. 3.

The lid 10 has, moreover, a protuberance 14 situated opposite a cutout 29, as may be seen in FIG. 1. In combination with the cutout 29, this protuberance 14 constitutes a pressing zone facilitating the opening of the lid 10.

FIGS. 4 to 9 show diverse variants of the embodiment of elastic elements, bearing the reference numerals 44 to 49.

For greater clarity, these elements are shown individually. It is, of course, to be understood that they are joined to the tube 28 of the cap 2 in FIGS. 1 and 2.

Figure 4:
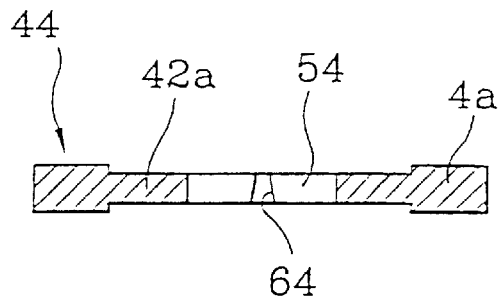
FIGS. 4 to 9 show partial axial sections of various embodiments of the membrane.

FIG. 4 shows a longitudinal section of a variant of a elastic element 44, which can be used for the dispensing of fluid products. This element 44 is provided with a peripheral a bulge 4a, with a thickness slightly greater than that of a central membrane 42a. The membrane 42a is planar and is provided with two cross-shaped slits 54 with edges 64 that are bevelled, flaring inwardly of the cap 2.

Figure 5:
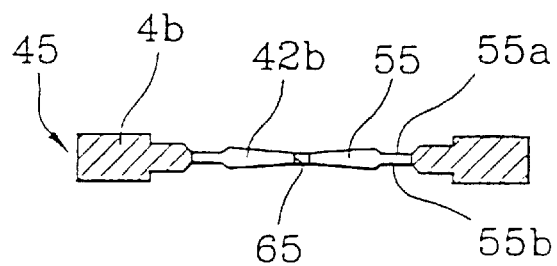

FIG. 5 shows a longitudinal section of another variant of the elastic element 45 which can be used for dispensing products of average viscosity, approximately 1 to 3 Pa·s. The element 45 is provided with a peripheral bead 4b having a thickness distinctly greater than that of a central embrane 42b. The membrane 42b is planar and is provided with two cross-shaped slits 55 with edges 65 that are parallel. Annular zones 55a, 55b with a smaller thickness smaller than the rest of the membrane 42b are provided on each side of the membrane 42b, imparting softness in use during the dispensing of the product. These zones 55a, 55b perform the same function as the groove or transition zone 43 of FIG. 1.

Figure 6:
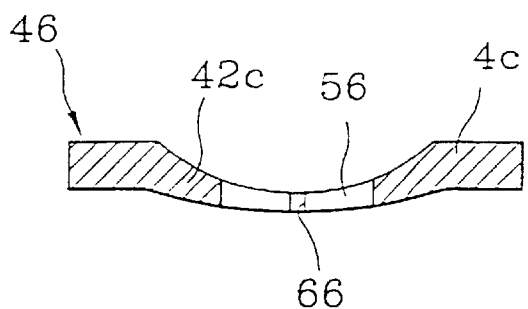

FIG. 6 shows a longitudinal cross-section of a variant of the elastic element 46 that can be used for dispensing highly viscous products in large doses. The element 46 is provided with a peripheral bulge 4c with a thickness that decreases considerably towards a central membrane 42c. The membrane 42c is domed inwardly of the cap and is provided with two cross-shaped slits 56 with edges 66 that are parallel.

Figure 7:
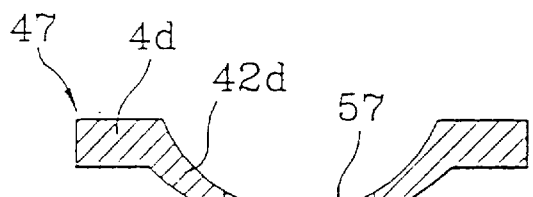

FIG. 7 shows a longitudinal cross-section of a variant of the elastic element 47 that can be used for dispensing highly viscous products. This element 47 is distinguished from that of FIG. 6 by a more pronounced concavity of a central membrane 42d. The element 47 has a peripheral bulge 4d and is provided with cross-shaped slits 57 and edges 67.

Figure 8:
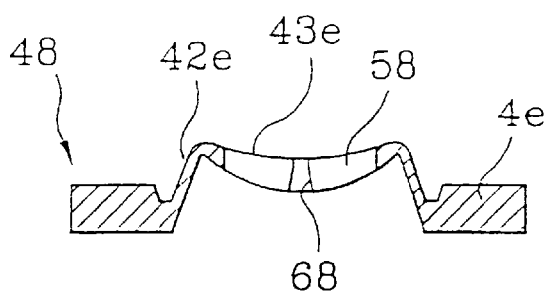

FIG. 8 shows a longitudinal cross-section of a variant of the elastic element 48 that can be used for dispensing products of average viscosity of approximately 3 to 5 Pa·s and permitting fine dosing of the product. This element 48 is provided with a peripheral bulge 4c joined to a central cap-shaped membrane 42e with a circumference emerges from the cap. This membrane 42e is provided with a concave central zone 43e wherein two cross-shaped slits 58 are obtained with edges 68 that are bevelled. The thickness of this central zone 43e progressively increases in a direction from the circumference towards the center. An annular groove delimits the sides of the membrane 42e.

Figure 9:
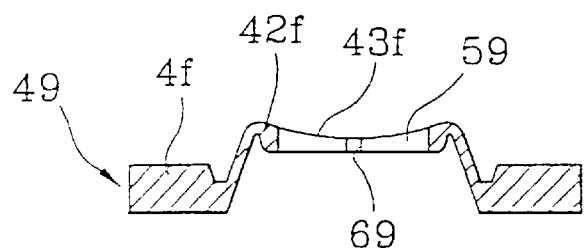

FIG. 9 shows a longitudinal cross-section of a variant of the elastic element 49, that can be used for dispensing-products with a low viscosity and permitting fine dosing of the product. This element 49 is provided with a peripheral bulge 4f to which is connected a central cap-shaped membrane 42f with a thickness smaller than that of the peripheral bulge 4f. This membrane 42f is provided with a central zone 43f with a greater thickness than that of the cap, the thickness of this zone 43f decreasing in a direction towards its center. This zone 43f has a concave shape with slits 59 and parallel edges 69 therein.

In general, the slits 54 to 59 have a width in the range of 0.05 to 1.0 mm. This width is chosen according to the viscosity of the product to be dispensed.

COMPARATIVE TEST

A comparison was made of the dispensing flow rate of (i) a dispensing head provided with a membrane with contiguous slits and (ii) a dispensing head provided with a membrane with noncontiguous slits.

Two reservoirs were each fitted with a dispensing head provided with a slit membrane and were filled with the same product (a shampoo). Except for the slit of the membrane, the two units were identical.

A first membrane A, substantially having the shape of the membrane 42 in FIG. 1, was provided with two crossed slits forming between them an angle of 90°. The membrane A was fixed on a first dispensing head as above. The membrane A was obtained by the moulding of an elastomeric material, with the slits being formed during the moulding, so that parallel edges of each slit were interspaced from one another by a distance of 0.5 mm.

A second membrane B had the same external geometry as the membrane A. The membrane B had two crossed slits configured like those of the membrane A, except that the edges of each slit were contiguous. The membrane B was moulded of the same material as the membrane A, and the cutting of the slits of the membrane B was effected by a cutting tool.

To measure the product dose dispensed from each dispensing head, nine occurrences of pressure at $5 \times 10^4$ Pa exerted on the reservoir for one second each were made at regular intervals.

The result has been transcribed in the table below

|  | Membrane | |
| --- | --- | --- |
|  | A | B |
| Total weight (g) | 28.76 | 11.12 |
| Weight/dose (g) | 3.19 | 1.24 |

Thus it was found that for an identical pressure and a constant length of slit, the membrane with noncontiguous slits permits a dispensing of the product that is much better (by a factor of 2.6) than the dispensing with a membrane with contiguous slits.

It is claimed:

1. A dispensing head for a product of a liquid-to-viscous consistency, comprising:
   a rigid cap having joined thereto an elastic flow-reducing element fitted with at least one slit provided with edges capable of moving away from one another under thrust of the product and of returning to an initial position when the thrust stops;
   characterized in that, in the initial position, the edges of the slit are noncontiguous and are interspaced from one another at a predetermined distance so as to define an opening through which the product cannot flow to any appreciable extent by gravity, thereby substantially reducing the thrust to be applied to cause the product to emerge;
   further characterized in that the cap has a hinged lid with a seal having a protuberance in a shape complementary to that of the slit.

2. A dispensing head according to claim 1, characterized in that the slit is obtained by moulding.

3. A dispensing head according to claim 1, characterized in that the elastic element is made of an elastomeric material.

4. A dispensing head according to claim 1, characterized in that the elastic element has a domed shape.

5. A dispensing head according to claim 1, characterized in that the elastic element and the rigid cap are formed together by moulding.

6. A dispensing head according to claim 1, characterized in that the elastic element is formed of a first thermoplastic elastomeric material.

7. A dispensing head according to claim 6, characterized in that the cap is formed of a second rigid or semirigid thermoplastic material.

8. A dispensing head according to claim 7, characterized in that the first and second elastomeric materials form a mechanical bond between by thermofusion.

9. A dispensing head according to claim 1, characterized in that the slit is rectilinear.

10. A dispensing head according to claim 1, characterized in that the slit is cross-shaped.

11. A dispensing head according to claim 1, characterized in that the predetermined distance between the edges of the slit is in the range of 0.05 mm to 1 mm.

12. A dispensing head according to claim 1, characterized in that the hinged lid is capable of being placed on the elastic element.

13. A dispensing head according to claim 12, characterized in that the seal is capable of coming to bearing on the elastic element.

14. A dispensing head according to claim 13, characterized in that the seal includes a peripheral bead surrounding the slit.

15. A dispensing head according to claim 13, characterized in that the seal includes a protuberance capable of being applied against the edges of the slit.

16. A dispensing head for a product of a liquid-to-viscous consistency, comprising a rigid cap having joined thereto an elastic flow-reducing element fitted with at least one slit provided with edges capable of moving away from one another under thrust of the product and of returning to an initial position when the thrust stops; characterized in that, in the initial position, the edges of the slit are noncontiguous and are interspaced from one another at a distance so as to delimit an opening through which the product cannot flow to any appreciable extent by gravity, thereby substantially reducing the thrust to be applied to cause the product to emerge, characterized in that the edges of the slit are bevelled.

17. A dispensing head for a product of a liquid-to-viscous consistency, comprising a rigid cap having joined thereto an elastic flow-reducing element fitted with at least one slit provided with edges capable of moving away from one another under thrust of the product and of returning to an initial position when the thrust stops; characterized in that, in the initial position, the edges of the slit are noncontiguous and are interspaced from one another at a distance so as to delimit an opening through which the product cannot flow to any appreciable extent by gravity, thereby substantially reducing the thrust to be applied to cause the product to emerge; further characterized in that the cap is provided with a hinged lid capable of being placed on the elastic element, in that the lid includes at least one sealing means capable of bearing on the elastic element, in that the sealing means has a protuberance capable of being applied against the edges of the slit, and in that the protuberance has a shape complementary to that of the slit.

* * * * *

UNITED STATES PATENT AND TRADEMARK OFFICE
CERTIFICATE OF CORRECTION

PATENT NO. : 6,089,411

DATED : July 18, 2000

INVENTOR(S): Gilles Baudin et al.

It is certified that an error appears in the above-identified patent and that said Letters Patent is hereby corrected as shown below:

Column 1, line 45, after "manufacture" insert a period; change "indeed" to --Indeed--.

Column 3, line 32, after "cally" insert a comma.

Column 4, line 58, after "container" but before the period, insert "3".

Column 5, line 18, after "element" insert --4--.

Column 6, line 15, change "embrane" to --membrane--;

line 18, delete "smaller"; and line 40, change "4c" to --4e--.

Signed and Sealed this

Seventeenth Day of April, 2001

*Attest:*

NICHOLAS P. GODICI

*Attesting Officer*      *Acting Director of the United States Patent and Trademark Office*